(12) United States Patent
Chen et al.

(10) Patent No.: US 6,564,910 B1
(45) Date of Patent: May 20, 2003

(54) DISK BRAKE FOR A BICYCLE

(76) Inventors: Sheng-Hui Chen, No. 65, Lane 362, Sec. 1, Chung Hwa N. Rd., Ta Kang Li, Tainan (TW); Jui-Pin Chen, No. 190-1, Si Nan Chuang, Fu Shan Li, Changhua (TW)

( * ) Notice: Subject to any disclaimer, the term of this patent is extended or adjusted under 35 U.S.C. 154(b) by 0 days.

(21) Appl. No.: 10/161,380

(22) Filed: Jun. 3, 2002

(51) Int. Cl.[7] .................................................. B02L 3/00
(52) U.S. Cl. ...................................... 188/26; 188/24.22
(58) Field of Search .............................. 188/26, 24.22, 188/73.31, 73.32, 250 G, 250 B, 251 R, 71.1, 73.1

(56) References Cited

U.S. PATENT DOCUMENTS 6,199,669 B1 * 3/2001 Huang .......................... 188/26
6,491,137 B2 * 12/2002 Lumpkin et al. ............. 188/26

* cited by examiner

Primary Examiner—Matthew C. Graham
(74) Attorney, Agent, or Firm—Hedman & Costigan, P.C.

(57) ABSTRACT

A disk brake for a bicycle includes a body having a first portion with a first passage defined in the first portion and a second portion with a second passage defined to correspond to the first passage. A first slot is defined in the body and communicates with the first passage and the second passage. A second slot is defined in an outer periphery of the body and communicates with the first slot. A locking notch is defined in the outer periphery of the body and communicates with the first slot near the second slot. A driving device is mounted in the body. Two brake pads are securely mounted in the first slot. Each brake pad includes an ear extending out to engage the locking notch to prevent the brake pad from rotating during braking.

6 Claims, 7 Drawing Sheets

DISK BRAKE FOR A BICYCLE

BACKGROUND OF THE INVENTION

1. Field of the Invention

The present invention relates to a disk brake, and more particularly to a disk brake for a bicycle.

2. Description of Related Art

Figure 7:
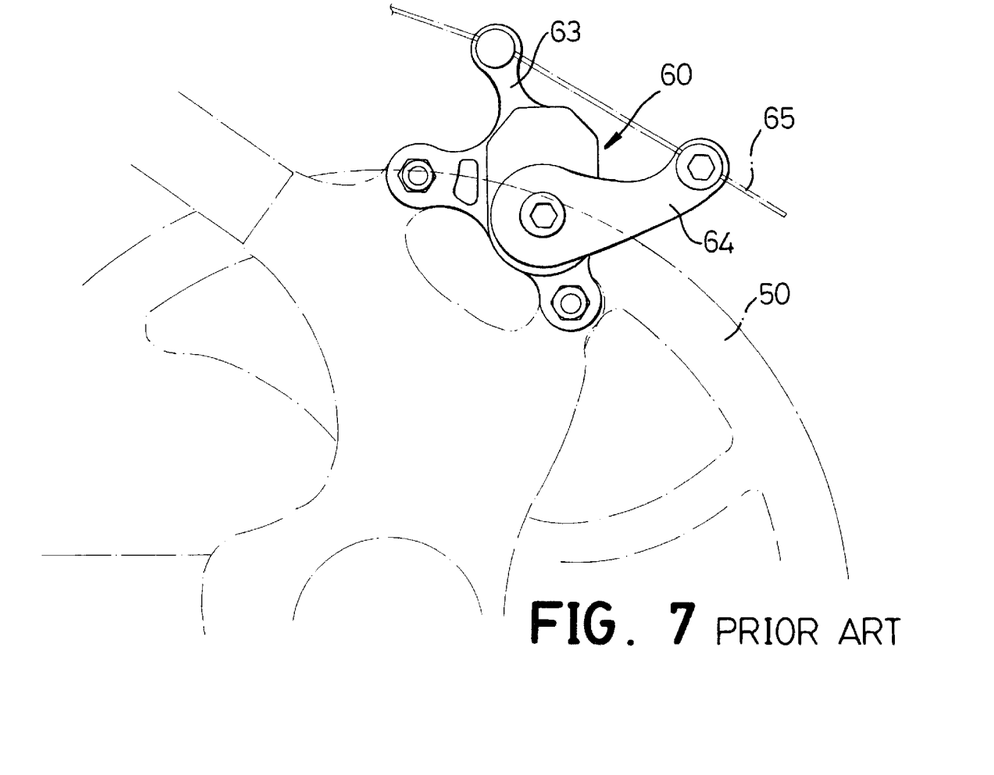
FIG. 7 is a side plan view of a conventional disk brake in accordance with the prior art on a bicycle.

With reference to FIG. 7, a conventional disk brake for a bicycle includes a disk (50) rotatably mounted on the bicycle and a body (60) mounted on the bicycle and corresponding to the disk (50). The body (60) has a first side (not numbered) and a second side (not numbered) and includes an arm (63) extending from the first side of the body (60). A lever (64) has a free end (not numbered) and an attached end (not numbered). The attached end is pivotally mounted on the first side of the body (60). A brake cable (65) with two ends (not numbered) is used to actuate the brake. One end (not shown) is attached to a brake handle (not shown), and the other end (not numbered) extends through the arm (63) and is secured on the free end of the lever (64) such that the brake cable (65) pulls the lever (64) when the brake handle is squeezed.

Figure 8:
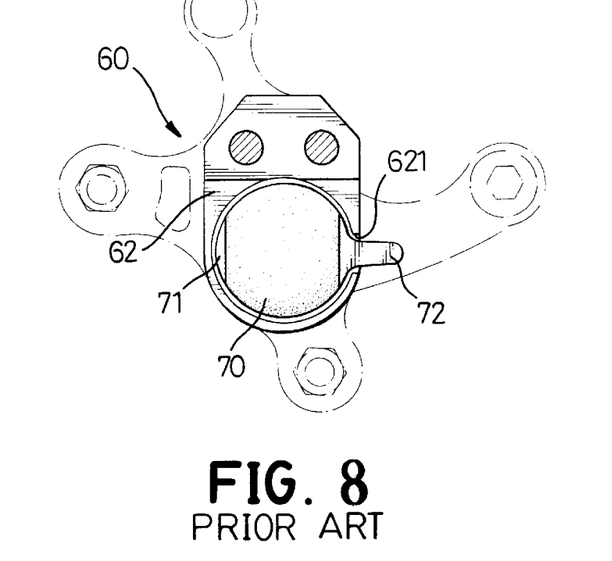
FIG. 8 is a side plan view in partial section of the disk brake in FIG. 7.
Figure 9:
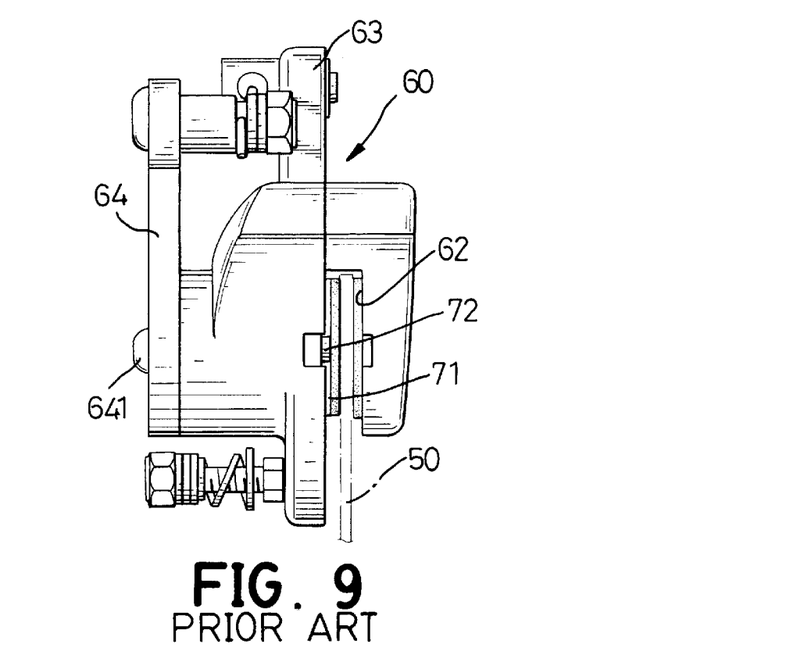
FIG. 9 is rear plan view of the disk brake in FIG. 7.
Figure 10:
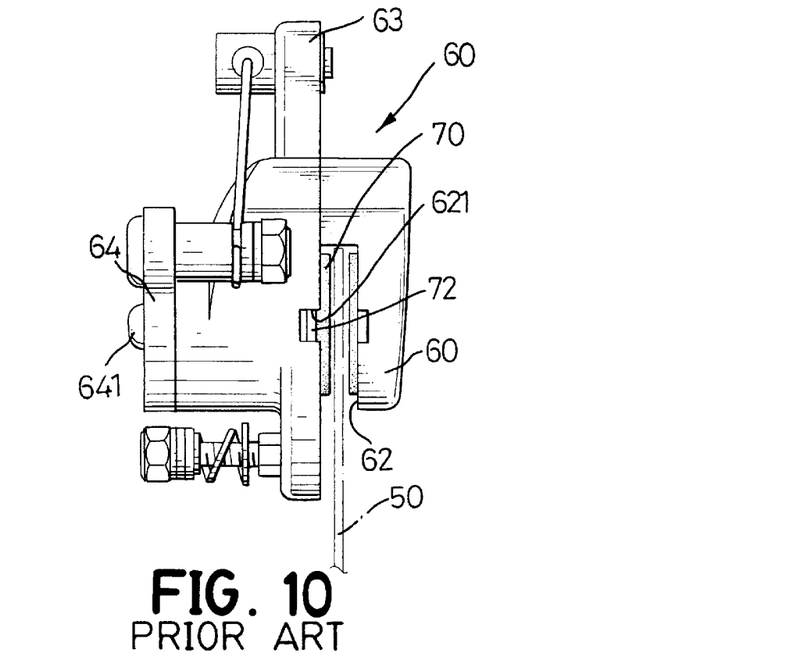
FIG. 10 is rear operational plan view of the disk brake in FIG. 7.

With reference to FIGS. 8, 9 and 10, a slot (62) is defined in the body (60) near the second side of the body (60). The first side and the second side of the body (60) are opposite to each other. The slot (62) includes two opposite sides each having a groove (621) defined to correspond to the other. Two brake pads (70) respectively mounted on a corresponding one of the two opposite sides of the slot (62) by means of the slot (62) and connected to a driving device (not shown) mounted in the body (60). Each brake pad (70) includes a metal bracket (71) abutting the body (60) and has an ear (72) extending from the metal bracket (71). The ear (72) is mounted in the groove (621) to hold the brake pad (70) in place during braking. The lever (64) is securely connected to the driving device by a bolt (641) and drives the driving device. The driving device presses the two brake pads (70) to squeeze the disk (50) to brake the bicycle when the brake cable (65).

However, the width of the slot (62) is limited because it must be wide enough to install the brake pads (70). The brake pads (70) will detach from the driving device due to the reactive force from the disk (50) when the brake pads (70) are worn and the gap between the disk (70) and the brake pads (70) is greater than the depth of the groove (621). Furthermore, the bolt (641) extends through the lever (64) from an outer periphery of the lever (64) so that the head of the bolt (641) will spoil the appearance of the disk brake.

The present invention has arisen to mitigate and/or obviate the disadvantages of the conventional disk brake for a bicycle.

SUMMARY OF THE INVENTION

The main objective of the present invention is to provide an improved disk brake for a bicycle.

To achieve the objective, the disk brake for a bicycle in accordance with the present invention comprises a, body having a first portion with a first passage defined in the first portion and a second portion with a second passage defined to correspond to the first passage. A first slot is defined in the body and communicates with the first passage and the second passage. A second slot is defined in an outer periphery of the body and communicates with the first slot. A locking notch is defined in the outer periphery of the body and communicates with the first slot near the second slot. A driving device is partially mounted in the body. Two brake pads are mounted in the first slot and held in place by the driving device. Each brake pad includes an ear extending radially outward and engaged with the locking groove to prevent the brake pad from rotating during braking.

Further benefits and advantages of the present invention will become apparent after a careful reading of the detailed description with appropriate reference to the accompanying drawings.

DETAILED DESCRIPTION OF THE INVENTION

With reference to the drawings and initially to FIGS. 1–4, a disk brake for a bicycle in accordance with the present invention comprises body (10) having a first portion (11) and a second portion (12) opposite to the first portion (11) of the body (10). A stationary arm (15) extends from the first portion (11) of the body (10). The body (10) includes a first passage (13) longitudinally defined in the first portion (11) of the body (10) and extending through the first portion (11). A second passage (131) is longitudinally defined in the second portion (12) of the body (10) and extends through the second portion (12). The first passage (13) and the second passage (131) align and communicate with each other. A first slot (20) is defined in the body (10) between the first portion (1 ) and the second portion (12) such that a bridge (14) is formed to connect the first portion (11) and the second portion (12). The first slot (20) has a bottom and perpendicularly communicates with the first passage (13) and the second passage (131) in the body (10). A second slot (22) is defined in an outer periphery of the body (10) and centrally communicates with the first slot (20). The first slot (20) has a width narrower than that of the second slot (22). A locking notch (21) is longitudinally defined in the outer periphery of the body (10) and centrally communicates with the first slot (20) near the second slot (22). The bottom of the first slot (20) is a straight edge (141). A concave surface (142) is defined in the straight edge (141) and corresponds to the first passage (13) and the second passage (131).

Figure 1:
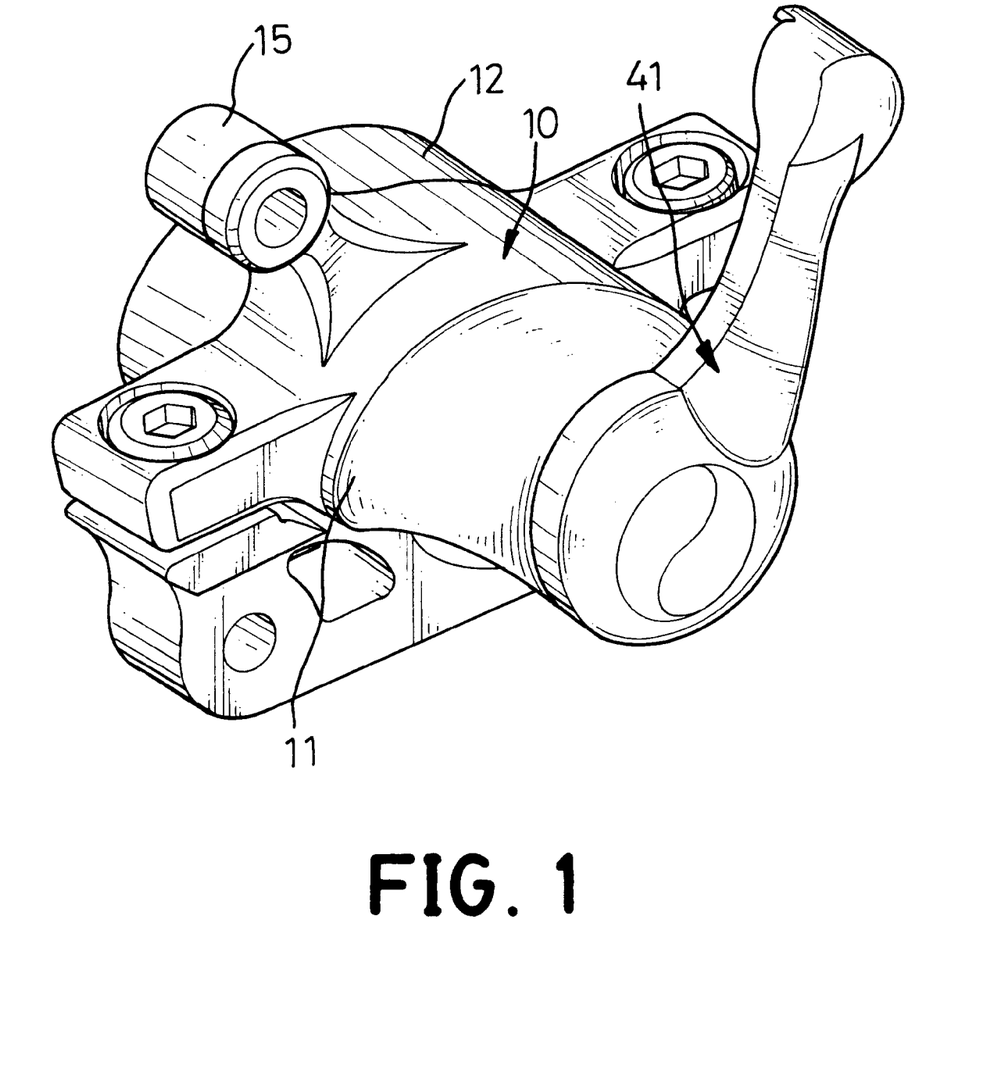
FIG. 1 is a perspective view of a disk brake for a bicycle in accordance with the present invention.
Figure 2:
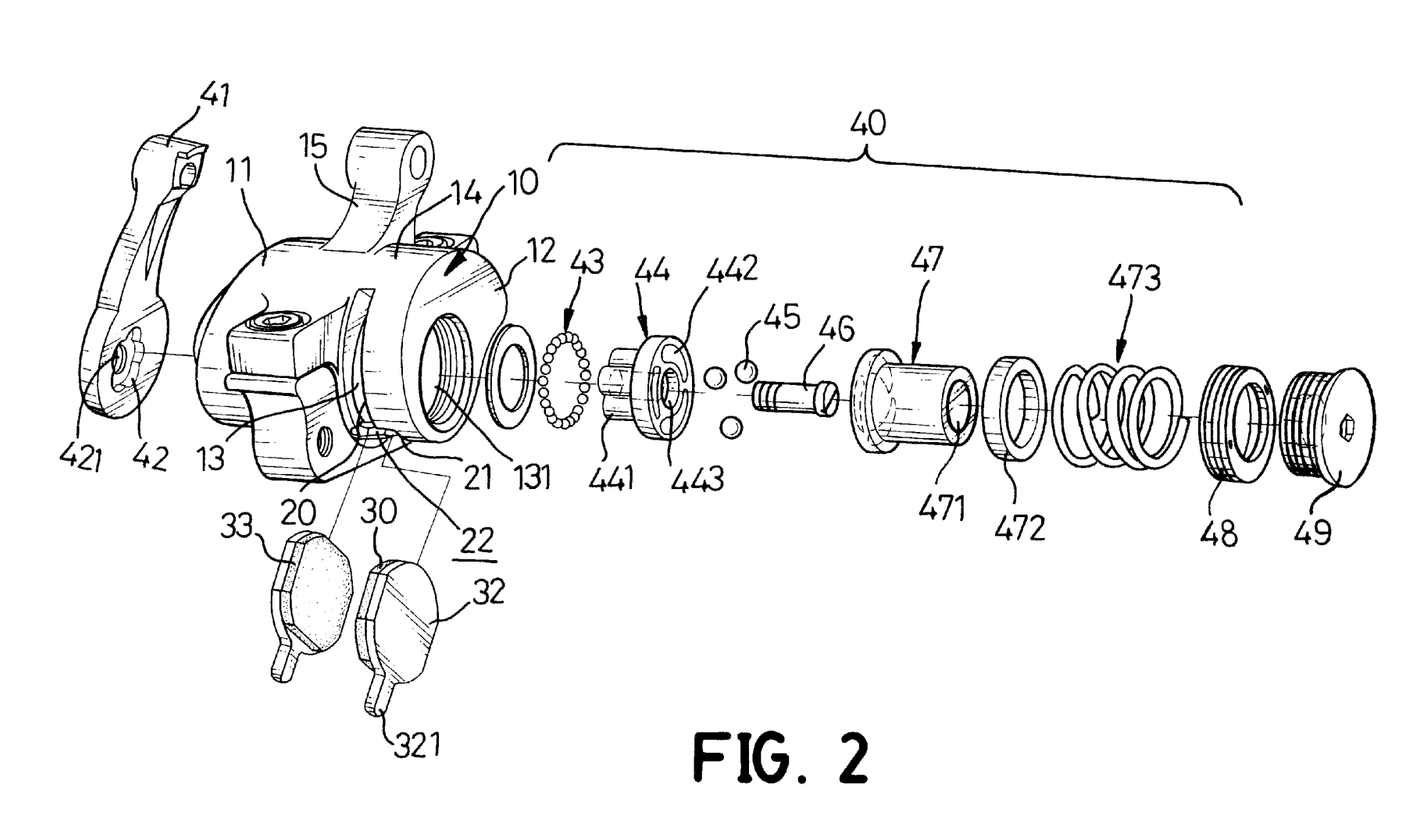
FIG. 2 is an exploded perspective view of the disk brake in FIG. 1.
Figure 3:
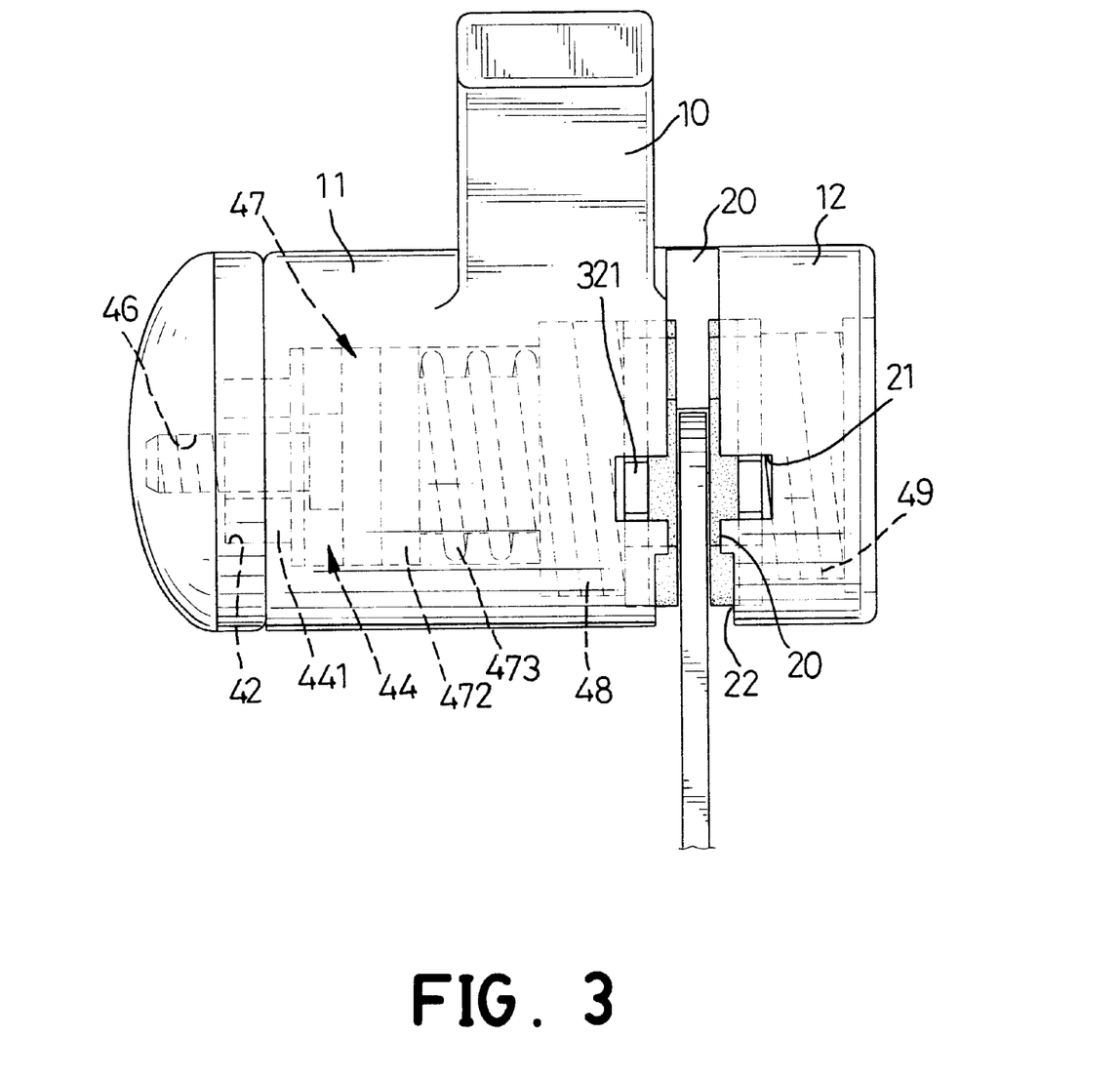
FIG. 3 is a bottom plan view of the disk brake in FIG. 1.

A driving device (40) is partially mounted and received in the body (10). The driving device (40) includes a lever (41) pivotally mounted on the body (10) and abutting the distal end of the first portion (11). The lever (41) includes a first end (not numbered) having a polygonal recess (42) with a bottom. The polygonal recess (42) is defined to correspond to the first passage (13) in the body (10) and has a threaded hole (421) centrally defined in the bottom of the polygonal recess (42). A drive member (44) is rotatably mounted in the first passage (13) and a ball bearing (43) is mounted between the drive member (44) and the lever (41). A stub (441) extends from the drive member (44) and engages the polygonal recess (42). An axial hole (443) is defined through the drive member (44). A bolt (46) extends through the axial hole (443) and is partially screwed into the threaded hole (421) to hold the lever (41) in place. Multiple guiding recesses (442) are defined in the drive member (44) opposite to the stub (441) around the axial hole (443). A steel ball (45) is mounted in each guiding recess (442) in the drive member (44). A driven member (47) is reciprocally mounted in the first passage (13) and abuts the steel balls (45) to hold the steel balls (45) in place between the drive member (44) and the driven member (47). A magnet (471) is secured in one end of the driven member (47) opposite to the drive member (44). A washer (472) is mounted around the driven member (47). A spring (473) is compressively mounted around the driven member (47) and abuts the washer (472) for providing a restitution force to the driven member (47). A locking piece (48) is secured in the first passage (13) near the first slot (20) to hold the spring (473) in place and has a central hole (not number) defined to allow the driven member (47) to extend into the first slot (20). A magnetic locking nut (49) is secured in the second passage (131) in the second portion of the body (10).

Figure 4:
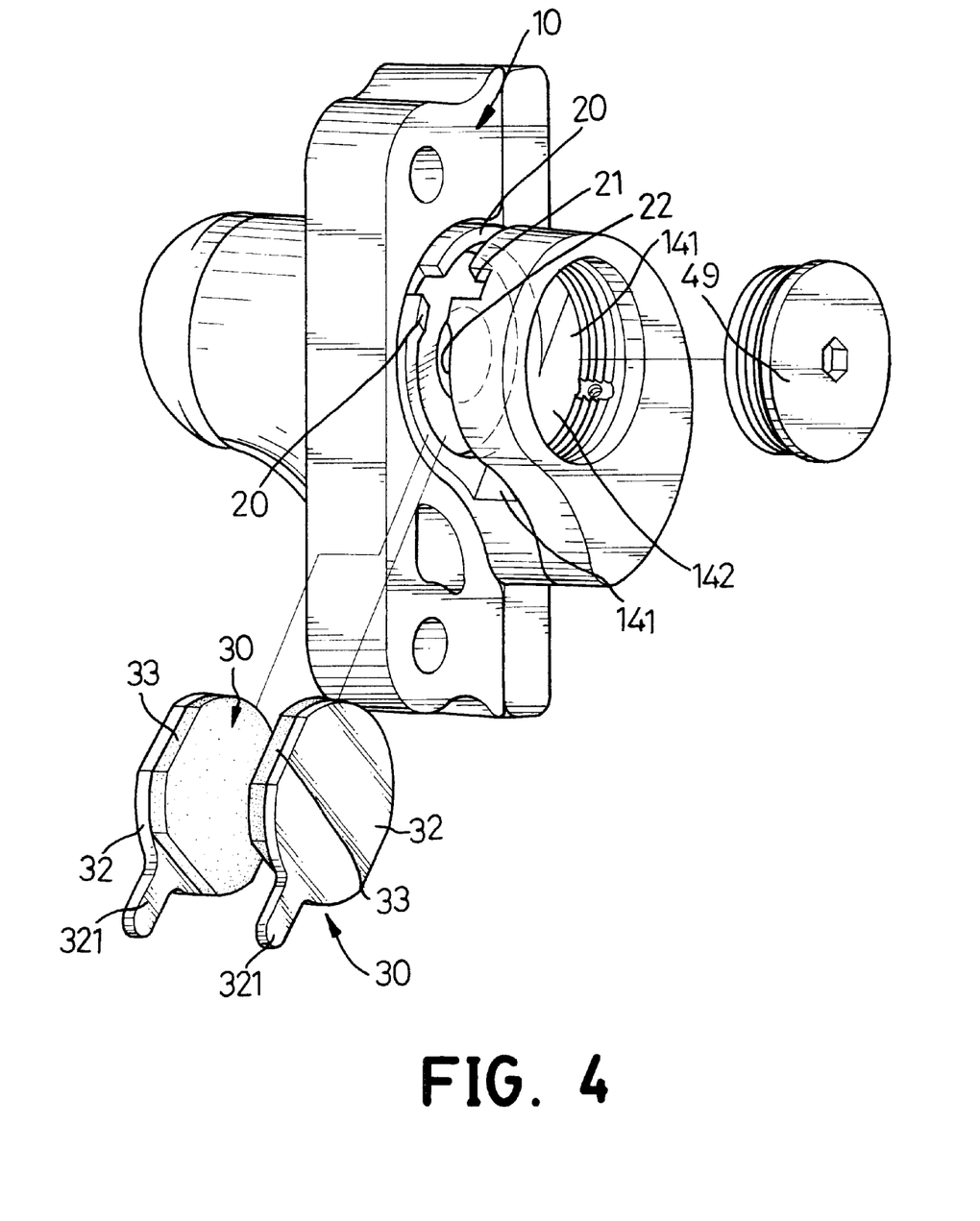
FIG. 4 is a partially exploded perspective view of the disk brake in FIG. 1.
Figure 5:
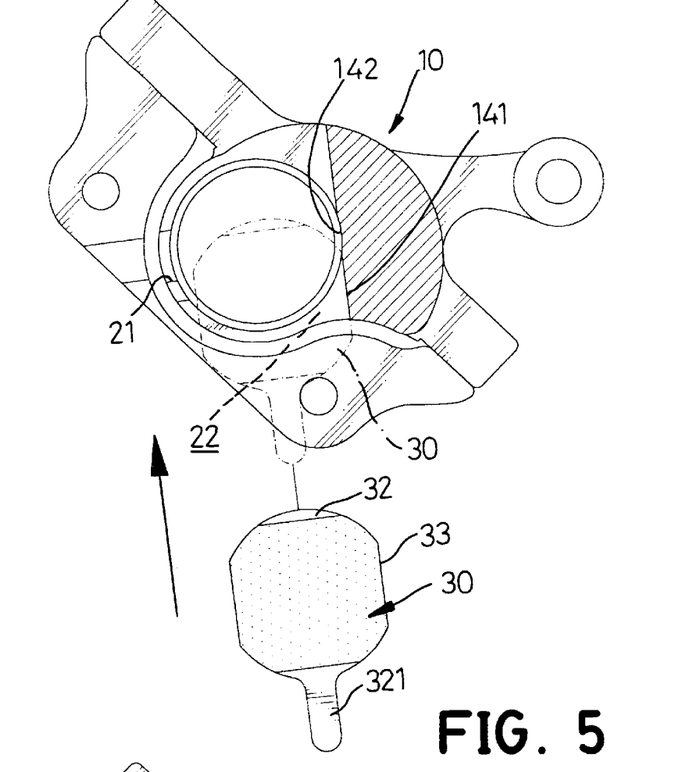
FIG. 5 is an operational side plan view of the disk brake in FIG. 1.
Figure 6:
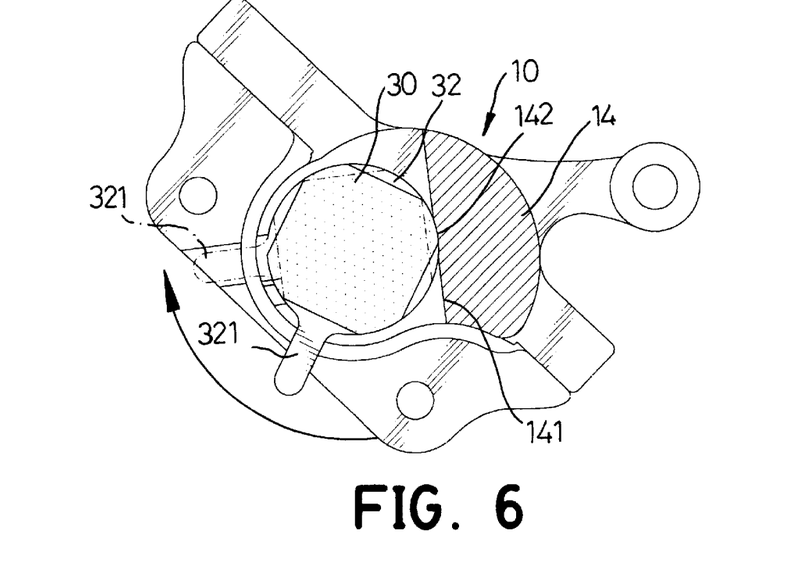
FIG. 6 is an operational side plan view of the disk brake in FIG. 1.

With further reference to FIGS. 4, 5 and 6, two brake pads (30) are mounted in the first slot (20) and face each other. The two brake pads (30) are respectively held in place by the magnet (471) in the driven member (47) and the magnetic locking nut (49). Each brake pad (30) has a magnetic metal seat (32) so that the two brake pads (30) can be held by the magnet (471) and the magnetic locking nut (49), respectively. Each metal seat (32) has two straight edges (33) formed parallel to each other. The metal seat (32) includes a first end (not numbered) having an ear (321) extending from the metal seat (32) and engaging the locking notch (21) to prevent the brake pad (30) from rotating during braking. The metal seat (32) has a second end (not numbered) opposite to the first end of the metal seat (32). The second end of the metal seat (32) is circular and corresponds to the concave surface (142).

To install the two brake pads (30), the two brake pads (30) are pressed against each other and inserted into the body (10) through the second slot (22). The straight edge (33) of the seat (32) slides on the straight edge (141) of the first slot (20) when the brake pads (30) are inserted into the body (10). The brake pads (30) are rotated to make the ears (321) engage the locking notches (21) when the circular second end of the seat (32) is in the concave surface (142). The circular second end of the seat (32) slides on the concave surface (142) when the brake pads (30) are rotating.

The disk brake for a bicycle in accordance with the present invention has the following advantages.

1. The brake pads are easy to install because the straight edge and the concave surface accurately guide the brake pads to a correct position.
2. The brake pads do not easily detach from the body because the brake pads are inserted into the body via the second slot and turn to be mounted in the first slot, and the first slot has a width narrower than that of the second slot.
3. The disk brake has a streamlined appearance. The lever is secured inside the body so that the appearance of the lever is smooth and a manufacturer's trademark can be formed on the lever.

Although the invention has been explained in relation to its preferred embodiment, it is to be understood that many other possible modifications and variations can be made without departing from the spirit and scope of the invention as hereinafter claimed.

What is claimed is:

1. A disk brake for a bicycle comprising:
    a body including:
        a first portion having a first passage longitudinally defined in the first portion;
        a second portion having a second passage longitudinally defined in the second portion, the second passage corresponding to the first passage;
        a first slot defined in the body, the first slot perpendicularly communicating with the first passage and the second passage;
        a second slot defined in an outer periphery of the body and communicating with the first slot, the second slot having a width wider than that of the first slot; and
        a locking notch longitudinally defined in the outer periphery of the body and centrally communicating with the first slot near the second slot;
    a driving device mounted in the body; and
    two brake pads securely mounted in the first slot and held in place by the driving device, where each brake pad includes a seat having an ear extending to engage the locking notch to prevent the brake pad from rotating during braking.

2. The disk brake as claimed in claim 1, wherein the first slot has a bottom formed as a straight edge and a concave surface is defined in the straight edge, where the concave surface corresponds to the first passage and the second passage in the body.

3. The disk brake as,claimed in claim 2, wherein the seat of the brake pad comprises two straight edges formed parallel to each other, a first end and a second end opposite to the first end of the seat, the ear extending from the first end of the seat and the second end of the seat being circular and corresponding to the concave surface.

4. The disk brake as claimed in claim 1, wherein the driving device comprises:
    a lever pivotally mounted on the body and abutting a distal end of the first portion, the lever including a first end having a polygonal recess defined to correspond to the first passage in the body and a threaded hole centrally defined in a bottom of the polygonal recess;

a drive member rotatably mounted in the first passage, the driving member including:
- a stub extending from the drive member and engaging the polygonal recess in the lever;
- an axial hole centrally defined through the drive member; and
- a bolt extending through the axial hole and partially screwed into the threaded hole in the lever to hold the lever in place;

a driven member reciprocally received in the first passage and having a magnet secured in one end of the driven member toward the first slot in the body; and a magnetic locking nut secured in the second passage in the second portion of the body.

5. The disk brake as claimed in claim 4, wherein the seat of the brake pad is made of magnetic metal so that the two brake pads are respectively held in place by the magnet in the driven member and the magnetic locking nut.

6. The disk brake as claimed in claim 4, wherein the driving device further comprises:
- a ball bearing mounted between the drive member and the lever;
- a washer mounted around the driven member;
- a spring compressively mounted around the driven member and pressing the washer to provide a restitution force to the driven member; and
- a locking piece secured in the first passage near the first slot to hold the spring in place and having a central hole defined to allow the driven member to extend into the first slot.

* * * * *